E. B. HESS AND L. C. MYERS.
TYPEWRITING MACHINE.
APPLICATION FILED JULY 8, 1920.

1,427,466.

Patented Aug. 29, 1922.
9 SHEETS—SHEET 1.

Fig. 1.

Inventors
Edward B. Hess
Lewis C. Myers
By their Attorney

E. B. HESS AND L. C. MYERS.
TYPEWRITING MACHINE.
APPLICATION FILED JULY 8, 1920.

1,427,466.

Patented Aug. 29, 1922.
9 SHEETS—SHEET 6.

UNITED STATES PATENT OFFICE.

EDWARD B. HESS AND LEWIS C. MYERS, OF BROOKLYN, NEW YORK, ASSIGNORS TO ROYAL TYPEWRITER COMPANY, INC., OF NEW YORK, N. Y., A CORPORATION OF NEW YORK.

TYPEWRITING MACHINE.

1,427,466. Specification of Letters Patent. Patented Aug. 29, 1922.

Original application filed May 11, 1920, Serial No. 380,601. Divided and this application filed July 8, 1920. Serial No. 394,672.

*To all whom it may concern:*

Be it known that we, EDWARD B. HESS and LEWIS C. MYERS, citizens of the United States of America, and residents of the city of New York, in the borough of Brooklyn, county of Kings, and State of New York, have invented certain new and useful Improvements in Typewriting Machines, of which the following is a specification.

The present invention relates generally to typewriting machines, and has for its main object a simple and reliable shift key system, and consists of the hereinafter described features of construction, a preferred form of which is disclosed in the accompanying drawings.

This case is a division of application, Ser. No. 380,601 filed May 11, 1920 in which is shown an improvement on the well-known Royal typewriter in which the transversely travelling carriage supports a shiftable platen carriage, and although the present invention is designed to be used more particularly in connection with such construction, it will be understood that, so far as certain features of the invention are concerned it is immaterial whether the shiftable carriage is carried by the transversely travelling carriage or vice versa.

Figure 1:
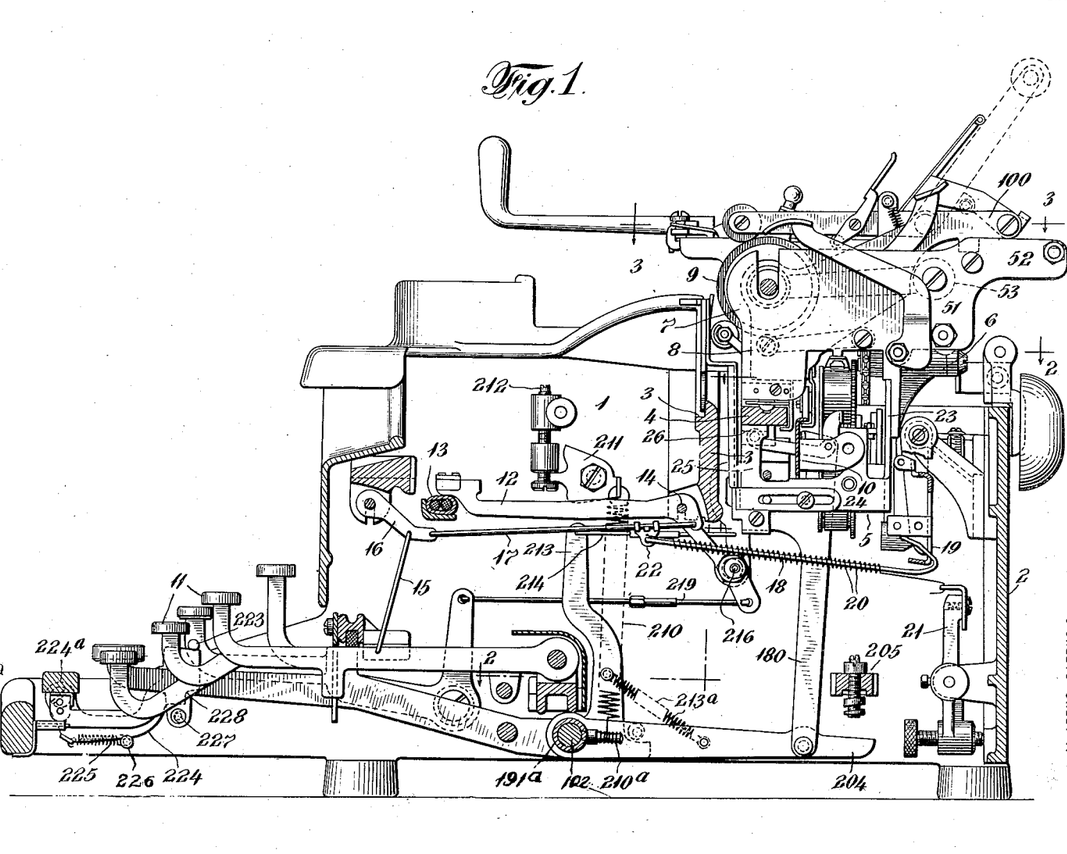
Fig. 1 is a vertical longitudinal section on an irregular line through a typewriting machine embodying the invention, with parts broken away and omitted.
Figure 2:
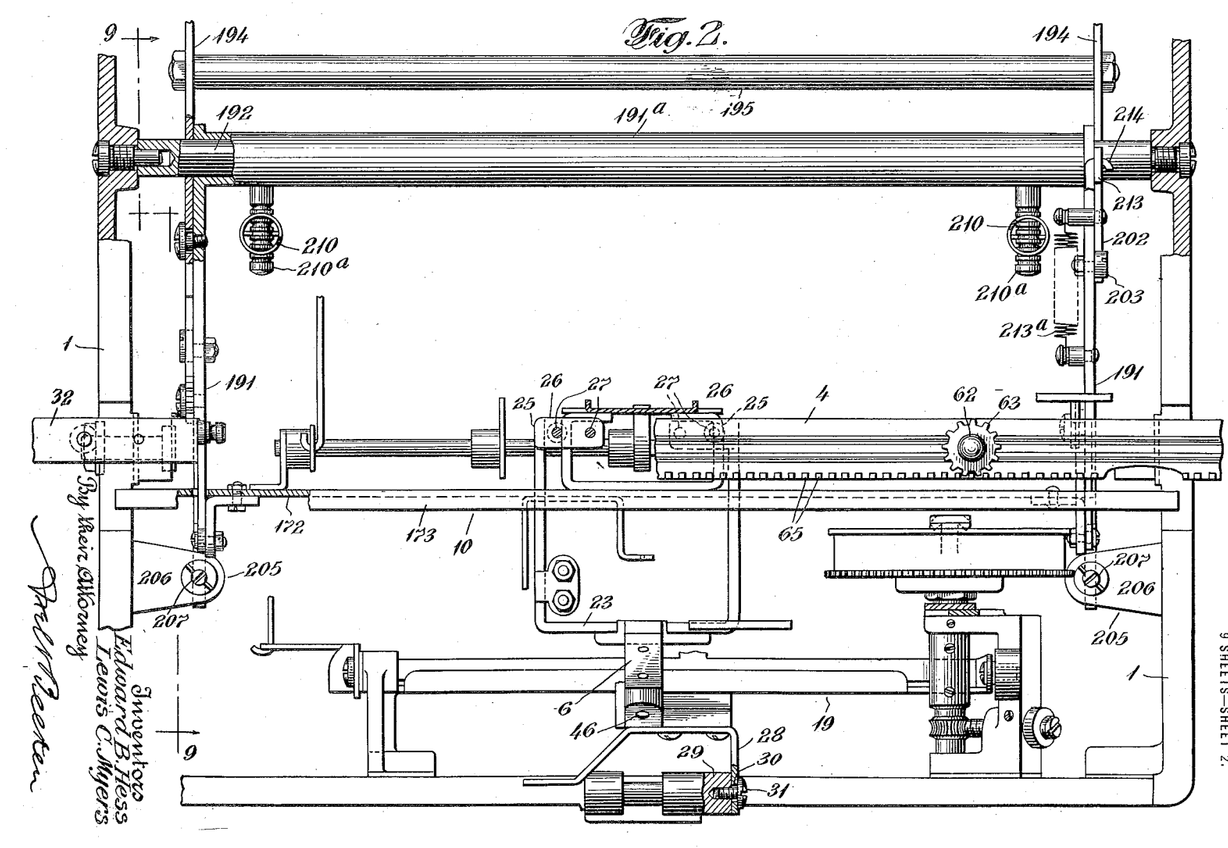
Fig. 2 is a horizontal sectional plan view on the line 2—2 of Fig. 1 with parts broken away and omitted.
Figure 3:
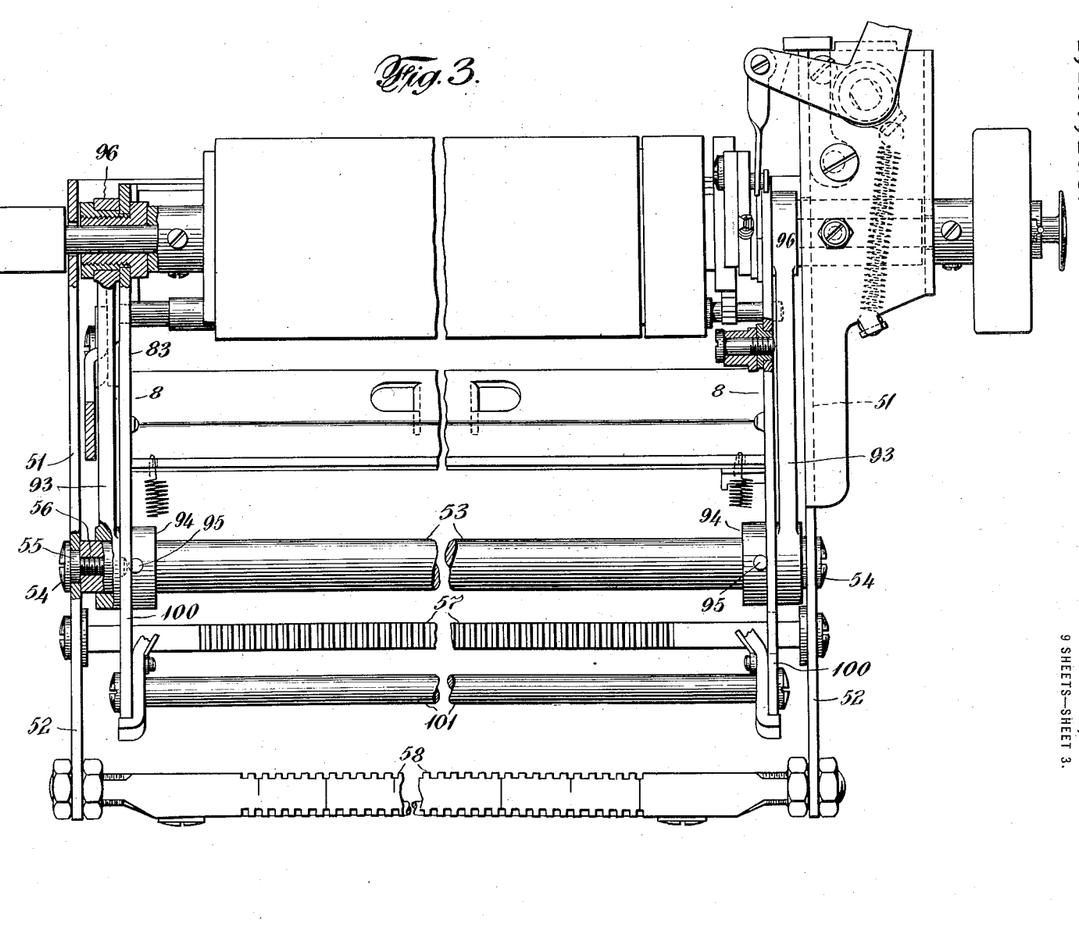
Fig. 3 is a horizontal sectional plan view of the platen and adjacent elements on the line 3—3 of Fig. 1, with parts broken away.
Figure 4:
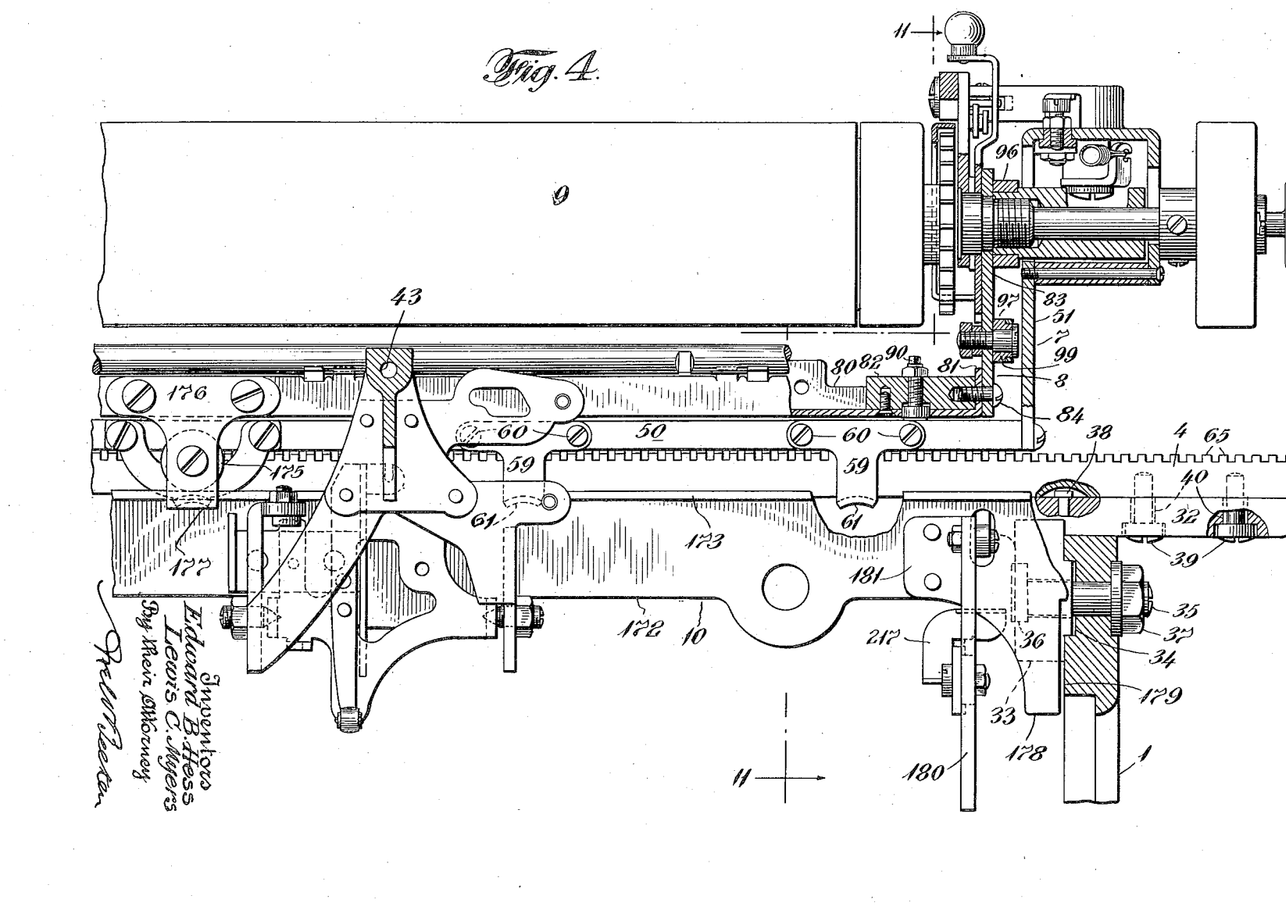
Fig. 4 is a vertical sectional view on the line 4—4 of Fig. 11 showing the parts adjacent to the left hand end of the platen looking from the rear.
Figures 5, 6, 7, 8:
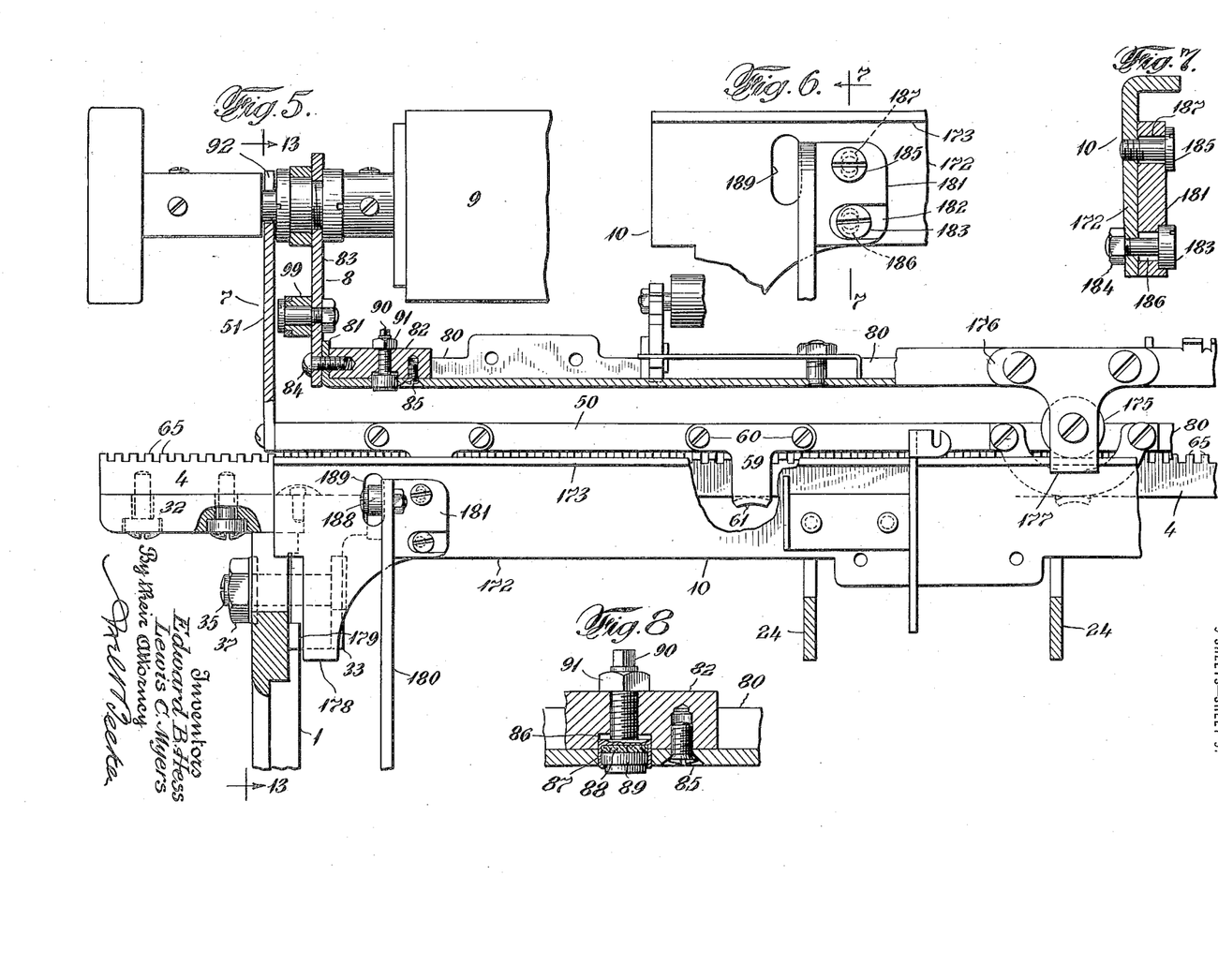
Fig. 5 is a vertical sectional view similar to Fig. 4 of the parts adjacent the right hand end of the platen.
Fig. 6 is a detail view of part of Fig. 5 showing the connection between the shift rail and the lifting arm.
Fig. 7 is a sectional view on an enlarged scale on the line 7—7 of Fig. 6.
Fig. 8 is an enlarged view in section of a part of the shiftable carriage shown in Fig. 5.
Figures 9, 10:
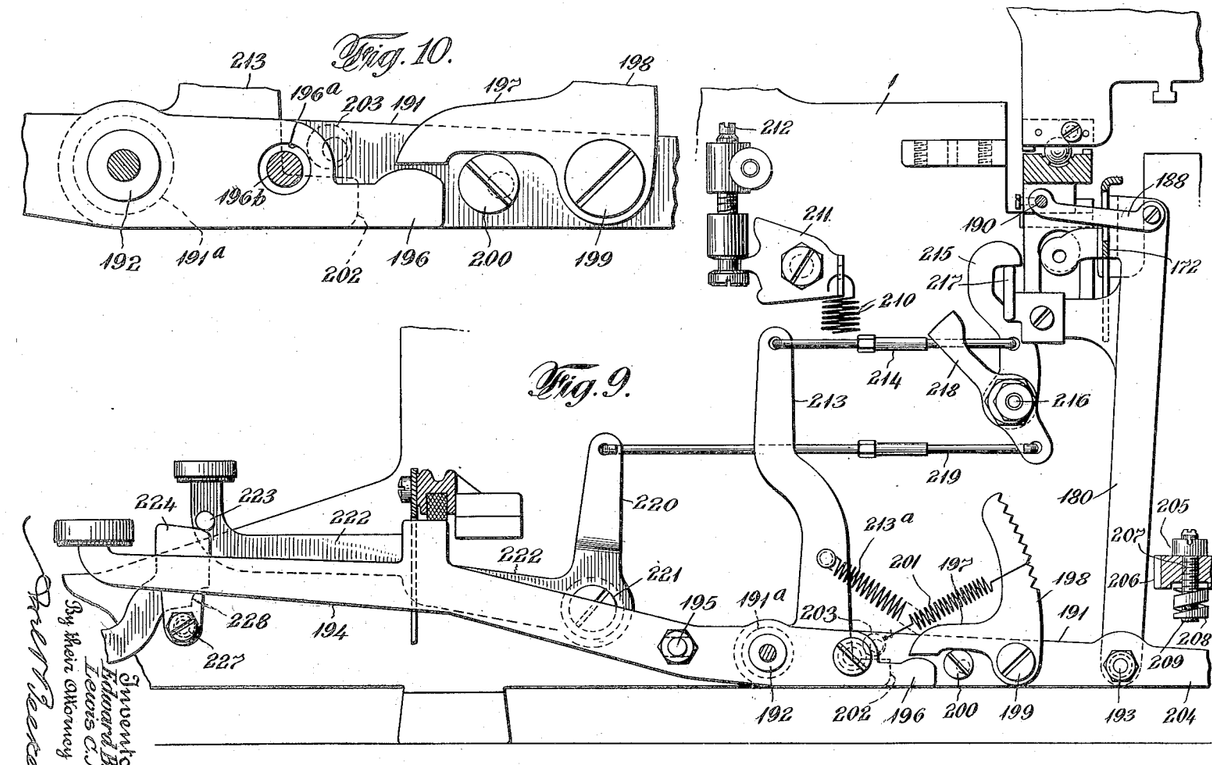
Fig. 9 is a vertical longitudinal sectional view on the line 9—9 of Fig. 2 showing more particularly the lifting carriage shift actuating and locking means.
Fig. 10 is an enlarged view of the lower part of Fig. 9.
Figures 11, 12:
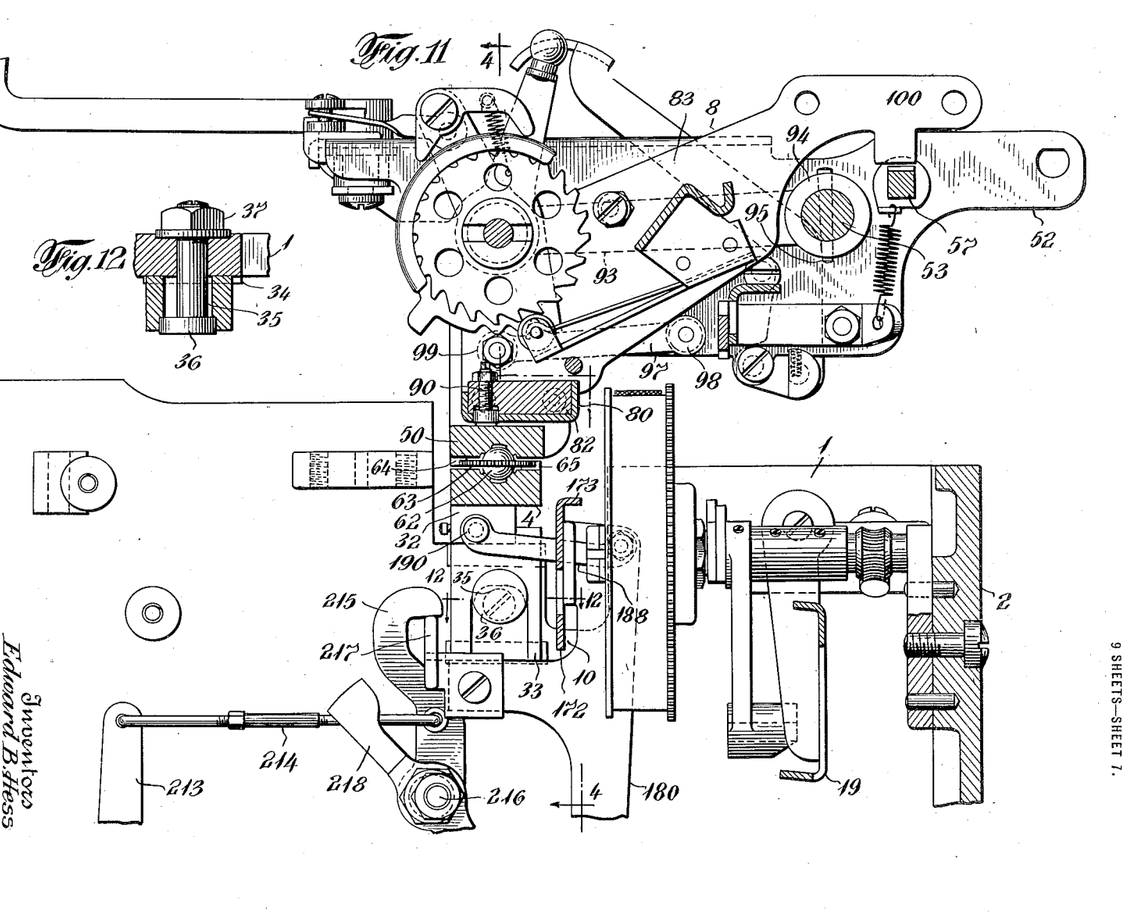
Fig. 11 is a vertical sectional view on the line 11—11 of Fig. 4.
Fig. 12 is a sectional detail view on the line 12—12 of Fig. 11.
Figure 13:
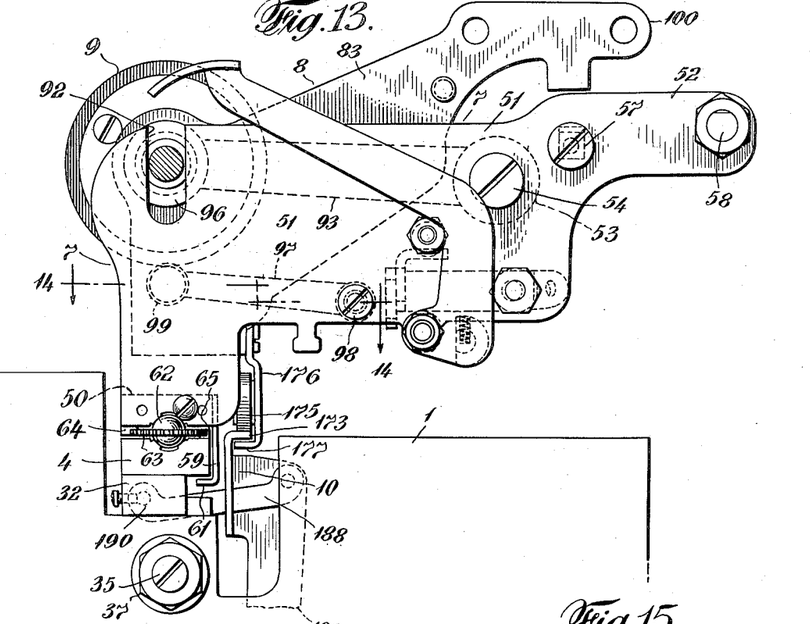
Fig. 13 is a vertical sectional view on the line 13—13 of Fig. 5.
Figures 14, 15:
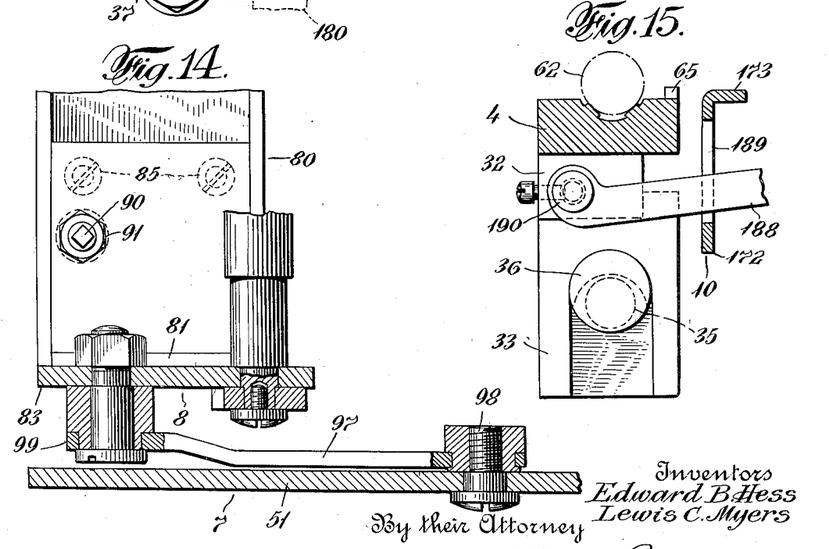
Fig. 14 is a horizontal sectional view on the line 14—14 of Fig. 13.
Fig. 15 is an enlarged detail view of the lower carriage rail and adjacent parts.
Figure 16:
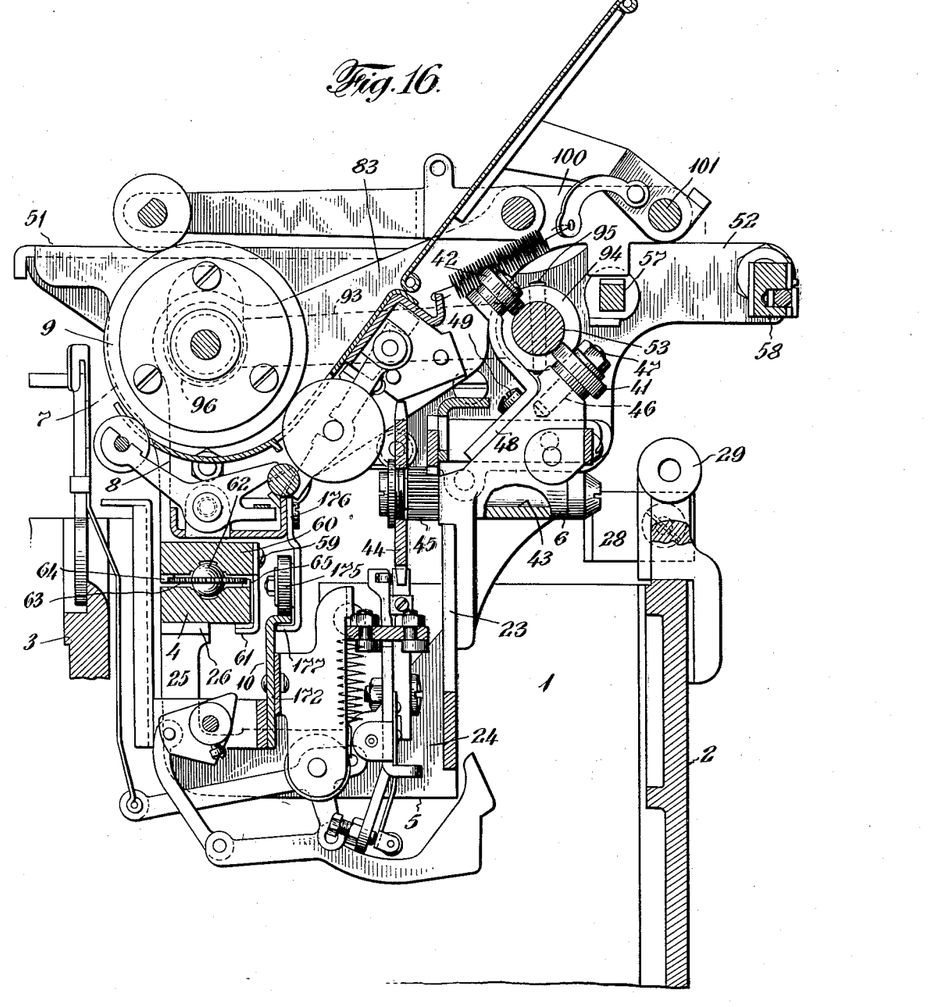
Fig. 16 is a vertical sectional view on an irregular vertical line.

The framing of the machine consists of the main frame work having side walls 1 and a rear wall 2 and supplementary framing comprising a segment support 3, lower stationary raceway 4, extending transversely across the machine and supported in the side walls 1, together with escapement framing extending longitudinally of the machine and consisting of an escapement frame 5 connected with the underside of lower raceway 4, and escapement wheel support 6 connected with the escapement frame and with the rear wall 2.

Supported on the lower raceway 4 is a transversely movable carriage 7 in which is supported a shiftable carriage 8 carrying the platen 9, the said shiftable carriage being raised and lowered by means of shift rail 10 extending transversely across the machine above the escapement frame and in rear of lower raceway 4.

11 represents key levers of the usual construction for actuating a plurality of normally forwardly recumbent type bars 12 pivoted in segment 3 in front of and below the platen and engaging a headrest 13 when inactive. As here shown each key lever 11 is pivotally supported at 14 in a suitable bearing and connected by means of a vertical link 15 with a front link 16 connected with the rear of the type bar by means of a link 17. To link 17 is secured a bar or link 18, the rear end of which is bent to engage a universal bar 19, said link 18 being provided with a spring 20, the rear end of which is connected to an adjustable rocking frame 21 and the front end of which is secured to a member 22 carried by link 17. It will be understood that all the type bars when actuated move to a common printing point or center on the platen.

Escapement frame 5 is made of sheet metal and is composed of a rear plate 23, forwardly extending arms 24 and upwardly extending arms 25 having horizontally disposed faces 26, separated by a gap and extending transversely toward each other, said faces 26 being suitably secured, as by means of screws and rivets 27, to lower raceway 4. Connected with rear plate 23 is escapement wheel support 6 connected by means of an angle plate 28 with a center stop bracket 29. This connection is adjustable by providing an elongated opening 30 in said angle plate for the reception of a screw 31 tapped into bracket 29. Lower ball race 4 is secured to the escapement frame and is supported on the side walls of the main frame. The mounting of said lower wall race is effected in the following manner. Carried at each end of said lower ball race and attached to the underside thereof is a block 32 having two downwardly projecting legs 33, side walls 1 and legs 33 being provided with a complementary horizontally disposed groove-and-tongue connection 34. Extending through side wall 1 is an adjusting screw 35 having at its inner end an eccentric 36 that engages between downwardly projecting legs 33. 37 indicates a lock nut for securing adjusting screw 35 in a position to which it has been adjusted. From the foregoing it will be understood that the fore-and-aft adjustment of lower ball race 4 and the escapement framing may be obtained by means of eccentric 36 and slot 30 and screws 31 in center stop bracket. The precise means for securing the lower raceway and block 32 together consists here of dowel pin 38 and binding screws 39. Screws 39 extend through openings 40, in block 32, that have a slightly greater diameter than the diameter of screws 39 and are tapped into lower ball race 4 so that a binding or clamping action is effected when said screws are brought home; and, to prevent displacement of the lower raceway with respect to block 32, the head of dowel pin 38 is located in the lower ball race and its stem has a snug fit in block 32.

The lower ball race 4 constitutes what may be termed a "mono-rail" support for the transversely travelling carriage 7, additional means for supporting the overhang of said carriage being provided on the escapement framing, said additional means here taking the form of two guide rollers 41 and 42. Escapement wheel support 6 is provided with a bushing 43 for the reception of the spindle of escapement wheel 44 and escapement pinion 45 and has an aperture 46 for the reception of screw 47 that holds the guide roller 41 in position. Guide roller 42 is carried by a plate 48 secured to support 6 by means of screw 49.

The transversely travelling carriage is composed of travelling ball race 50 and end standards 51 provided with rearwardly extending overhanging portions 52 in which are mounted a transversely extending guide rod 53 (which here takes the form of a rock-shaft) that engages rollers 41 and 42. In the form here disclosed, rock shaft 53 is held at each end by a bearing screw 54 having a bearing portion 55 fitting in an opening in overhang 52 and provided with a threaded stem 56 in engagement with a threaded opening in said rock shaft. 57 indicates a margin rail and 58 a tabular bar, both of which are connected with overhanging portions 52 and which, in addition to the primary function implied by their names, also act as stay rods for the travelling carriage. 59 indicates clamps that are attached by means of screws 60 to upper ball race 50 and provided with horizontally extending and curved guide portions 61 that engage the underside of the lower ball race 4. Between the upper and lower raceways are the usual balls 62 having encircling gears 63 engaging with racks 64 and 65 of said raceways.

The shiftable carriage 8 is constructed as follows:—80 is a transversely extending and horizontally disposed channel member of sheet metal having bent ends 81 adjacent which are filling blocks 82. Said channel member is connected with end walls 83 of the shiftable carriage by means of screws 84 that pass through walls 83, ends 81 and into filling blocks 82. Channel member 80 and filling block 82 are also connected together by means of counter-sunk screws 85 and suitable bumper stops are carried by filling blocks 82, said stops engaging with the upper side of upper raceway 50. In the present instance, this bumper stop is constructed as follows. A recess 86 is formed in the filling block and in the channel member in which is seated a cup shaped holder 87 containing a piece of leather or other similar substance 88 held in place by an abutment member 89 having a shoulder, as shown, under which passes the inturned edge of cup shaped member 87. Said cup shaped member is carried by a threaded stem 90 passing through filling block 82 and locked in position by means of a nut 91. There is a bumper structure of this character in each filling block. The shaft of platen 9 extends through end walls 83 in such manner that the platen is freely rotatable in said end walls; and said platen shaft also extends through vertical slots 92 in end standards 51 of the travelling carriage. The shiftable carriage is mounted in two pairs of parallel arms carried by the travelling carriage. One pair of these arms 93 are supported on the transversely extending guide rod 53 which, as previously pointed out, is a rock shaft with which the guide rollers 41 and 42 engage, each of these arms being provided with a bushing 94 secured to said rock shaft by pins 95 and the outer ends of arms 93 being provided with sleeves 96 through which the platen shaft passes. The other pair of parallel arms 97 are pivotally supported at 98 in end standards 51 of the transversely moving carriage and are pivotally connected at their outer ends 99 with end frame 83 of the shiftable carriage. End walls 83 of the shiftable carriage have overhanging portions 100 that are connected by a transverse brace rod 101.

Suitable means are provided for lifting and lowering the shiftable carriage which, in this instance, comprises essentially a shift rail 172 extending transversely of the machine above the escapement frame and consisting of an angular piece of sheet metal, one face of which constitutes a horizontal track 173 on which travels the shiftable carriage travelling roller 175 carried by a suitable carriage clamp 176 having a horizontally extending guide member 177 engaging with the under side of horizontal track 173. Clamp 176 is secured in any suitable manner to channel member 80.

At each of its ends said shift rail has a downwardly extending projection 178 closely adjacent the abutment surfaces 179 of the side wall of the main frame to take up the end thrust of the carriage. Said shift rail is carried by two vertical shift arms 180 one at each end of the machine to which it is attached by means of angular extensions 181. In the present instance, provision is made for vertically adjusting said shift rail with respect to one or both of the vertical shift arms 180. As shown, angular extensions 181 are provided with a horizontal slot 182 in which is seated an eccentric adjustment member 183, the stem of which passes through shift rail 172 and is locked in position by means of lock-nut 184. Eccentric member 183 thus constitutes a binding screw that clamps shift rail 172 and extension 181 together. 185 is a second binding screw that passes through extension 181 and is tapped into shift rail 172. At the point where binding screws 183 and 185 pass through extension 181, there are vertically elongated openings 186 and 187. If binding screws 183 and 185 are loosened, it will be understood that, by shifting the eccentric 183, rail 172 may be adjusted vertically so as to render said shift rail parallel with the lower raceway, after which the binding screws are tightened to retain the parts in the position to which they have been adjusted. Said shift rail and shift arms are carried by two pairs of parallel links, an upper pair 188, pivotally connected with vertical shift arms 180 at one end and extending through openings 189 in the shift rail and pivotally supported on pin 190 carried in block 32 of lower raceway 4; and another and lower pair, 191 having a sleeve 191ª secured on rock shaft 192 and having pivotal connection at 193 with shift arms 180. It will be observed that by this construction shift rail 172 is adjusted fore and-aft in unison with the lower raceway and escapement frame. Any suitable means may be used to actuate shift rail 172 but in the present instance two shift key levers 194 are loosely mounted on rock shaft 192 and are connected together by a transverse tie-rod 195 so that when either shift key lever is actuated the other is also actuated. One of the shift key levers is provided with a rearwardly projecting member 196 that engages an arm 197 of intermediate cushioning member 198 pivotally supported at 199 on one of parallel links 191, said arm 197 being normally held against adjustable stop 200 by reason of a spring 201 connecting intermediate member 198 with one of parallel arms 191. Member 196 is also provided with an opening 196ª through which extends stop 196ᵇ on one of arms 191. The other of said levers, 194, is provided with an extension 202 that engages with an eccentrically adjustable stop 203 on the other of said arms 191. Each of parallel arms 191 is provided with a rearwardly extending stop portion 204 that comes in contact with a compressible bumper stop 205. Said bumper stops are carried by lugs 206 extending from the side walls of the frame and consists each of a threaded stem 207 having an enlarged helical spring portion 208 provided with a leather or felt filler 209. This bumper stop limits the upward movement of the shiftable carriage. 210 indicates the carriage balance springs supported at their upper end in brackets 211, each adjustable by means of screw 212 conveniently located directly under the ribbon spool on the dust shed and readily accessible from the top of the machine for adjustment. The lower end of said springs 210 are secured on pins 210ª passing through sleeve 191ª into rock shaft 192. Rigidly connected to one of shift key levers 194 is an arm 213 connected by means of link 214 to lock dog 215 which latter is pivotally supported on a center 216 and is adapted to engage with the upper surface of a shift locking plate 217 carried on one of the vertical shift arms 180. A spring 213ª connects arm 213 with one of parallel arms 191. Center 216 is a center fixed on the framework and carries another shaft locking dog 218 connected by means of a link 219 with an upright arm 220 pivotally supported at 221 and forming a part of the shift lock key lever 222. Shift lock key lever 222 is provided with a pin 223 normally engaged by latch 224 pivotally supported at 224ª and urged into an upward position by spring 225 connected to the framework at 226. The action of this spring is transmitted through the connections described and normally holds the locking dog 218 out of engagement with shift lock plate 217. Spring 213ª through its connection with member 213, normally holds locking dog 215 in engagement with shift locking plate 217 and also serves to maintain shift key levers 194 in an elevated position. One of said shift key levers is provided with a pin 227. When shift key lever 194 is depressed, extension 196 will engage arm 197 of cushioning member 198 and the lower part of opening 196ª will engage stop 196ᵇ and, at the same time, extension 202 will engage stop 203. This will cause arms 191 to be elevated, thereby moving lock dog 215 out of engagement with shift locking plate 217 and will cause the elevation of vertical shift arms 180 and hence shift rail 172. This upward action will continue until the stop portions 204 engage bumper stops 205. It will be noted that when shift levers 194 is depressed, the movement will be cushioned, in part, by engagement of extension 196 with arm 197 and that thereafter upward movement will be limited and cushioned by bumper stop 205 after which a requisite cushioning effect will again be obtained by the action of the members 196 and 197. Lowering of the elements will be cushioned by carriage shift balance spring 210 in the usual way and by bumper stops 89. If shift key locking lever 222 is depressed, latch 224 will be tilted in a downward direction carrying with it shift key lever 194 and this downward movement will continue until surface 228 of the latch locks against pin 227. In these circumstances, not only will the action previously described take place but locking dog 218 will swing in beneath shift locking plate 217 and retain the carriage in its upper case position. The parts may be released by depressing shift key lever 194 sufficiently to release latch 224, the spring 225 of which will then assert itself and move shift locking key lever 222 into its normal position; and, at the same time, spring 213ª will restore shift key lever 194 to its normal position. The release of latch 224 in the manner described will also restore the locking dogs to their normal position, locking dogs 218 being moved away from, and locking dog 215 being moved into engagement with, shift locking plate 217. The upward movement of shift rail 172 will be communicated to the roller 175 that is supported by clamps 176 of shiftable carriage and the latter will rise with a parallel movement by reason of parallel arms 93 and 97 swinging on centers 53 and 98. Owing to vertical slots 192 in the end standards 51 of the travelling carriage, the shaft of platen 9 will be free to rise with the shiftable carriage. When the shift rail is lowered, gravity will restore the shiftable carriage to its lower case position, this movement also being insured by reason of track portion 173 and horizontal guides 177. It will, of course, be understood that the transversely travelling carriage will carry the shiftable carriage with it when the latter is in either upper or lower case position and that said movement is facilitated by roller 175, that travels on track 173 of shift rail 172.

The construction of the shiftable carriage herein disclosed is claimed in application Ser. No. 404,534, filed August 19, 1920.

The construction of the line space advancing mechanism herein disclosed is claimed in application Ser. No. 399,376, filed July 27, 1920.

The construction of the overhead bail actuating mechanism and the paper pan actuating means herein disclosed is claimed in application Ser. No. 569,321, filed June 19, 1922.

The feature of providing raceways 4 and 50 with central gutters herein disclosed is claimed in application Ser. No. 569,322, filed June 19, 1922.

We claim—

1. In a typewriting machine, a shift mechanism including two shift key levers, a tie rod connecting said levers at a point intermediate their ends; in combination with a pivotal support, for the levers, in rear of the tie rod, and arms for the shift mechanism, mounted on the pivotal support independently of the levers and actuated by the latter.

2. In a typewriting machine, a shift mechanism including two shift key levers, a tie rod connecting said levers at a point intermediate their ends; in combination with a rock-shaft, in rear of the tie rod, on which the levers are loosely and pivotally supported, and arms for the shift mechanism rigidly mounted on the rockshaft and actuated by the levers.

3. In a typewriting machine, a shift mechanism including two shift key levers, a tie rod connecting said levers at a point intermediate their ends; in combination with a rockshaft, in rear of the tie rod, on which the levers are loosely and pivotally supported, a sleeve secured to said rockshaft, and arms, for the shift mechanism, connected to said sleeve and actuated by the levers.

4. In a typewriting machine, a pair of vertical shift arms, an upper and a lower pair of parallel arms loosely connected to the vertical arms, means for pivotally supporting the upper pair of arms on the framework, a sleeve connecting the lower pair of arms, a rockshaft on which the sleeve is mounted and to which it is secured, a pair of shift key levers pivotally and loosely supported on the rockshaft and actuating the lower pair of arms, and a tie rod, in front of the rockshaft, connecting said shift key lever.

5. In a typewriting machine, a shift mechanism including two shift key levers, a tie rod connecting said levers at a point intermediate their ends; in combination with a pivotal support, for the levers, in rear of the tie rod, and arms for the shift mechanism, mounted on the pivotal support independently of the levers, rearward extensions on the shift key levers, and abutment means on the arms for the shift mechanism including a yieldingly mounted arm to engage the aforesaid rearward extensions.

6. In a typewriting machine, a shift mechanism including two shift key levers, a tie rod connecting said levers at a point intermediate their ends; in combination with a pivotal support, for the levers, in rear of the tie rod, arms for the shift mechanism, mounted on the pivotal support independently of the levers, rearward extensions on the shift key levers, abutment means on the arms for the shift mechanism including a yieldingly mounted arm to engage the aforesaid rearward extensions, and yielding stops on the framework for limiting the upward movement of the arms for the shift mechanism.

7. In a typewriting machine, a shift mechanism including two shift key levers, a tie rod connecting said levers at a point intermediate their ends; in combination with a pivotal support, for the levers, in rear of the tie rod, arms for the shift mechanism, mounted on the pivotal support independently of the levers, rearward extensions on the shift key levers, abutment means on the arms for the shift mechanism including a yieldingly mounted arm to engage the aforesaid rearward extensions, yielding stops on the framework for limiting the upward movement of the arms for the shift mechanism, and carriage balance springs connected with the arms for the shift mechanism.

8. In a typewriting machine, a shift mechanism including two shift key levers, a tie rod connecting said levers at a point intermediate their ends; in connection with a pivotal support, for the levers, in rear of the tie rods, arms for the shift mechanism, mounted on the pivotal support independently of the levers, rearward extensions on the shift key levers, abutment means on the arms for the shift mechanism including a yieldingly mounted arm to engage the aforesaid rearward extensions, yielding stops on the framework for limiting the upward movement of the arms for the shift mechanism, a sleeve surrounding the pivotal support and connected with the arms for the shift mechanism, and carriage balance springs connected with the sleeve.

9. In a typewriting machine, two horizontally disposed and pivotally supported shift key levers connected to move in unison, vertical shift arms, an upper and a lower pair of horizontally disposed and pivotally supported parallel links pivotally connected to said vertical shift arms, an intermediate cushioning member pivotally supported on one of the lower parallel links, a spring connected with said member and with the link on which it is supported to normally urge the said member in one direction, an extension on one of the shift key levers engaging with said member when the shift key levers are actuated, and complementary abutment members on the shift key levers and lower pair of links.

10. In a typewriting machine, two horizontally disposed and pivotally supported shift key levers connected to move in unison, vertical shift arms, an upper and lower pair of horizontally disposed and pivotally supported parallel links pivotally connected to said vertical shift arms, an intermediate cushioning member pivotally supported on one of the lower parallel links, a spring connected with said member and with the link on which it is supported to normally urge said member in one direction, an extension on one of the shift key levers engaging with said member when the shift key levers are actuated, complementary abutment members on the shift key levers and lower pair of links, and compressible bumper stops on the framework for limiting the movement of the lower pair of links.

11. In a typewriting machine, two horizontally disposed and pivotally supported shift key levers connected to move in unison, vertical shift arms, an upper and a lower pair of horizontally disposed and pivotally supported parallel links pivotally connected to said vertical shift arms, an intermediate cushioning member pivotally supported on one of the lower parallel links, a spring connected with said member and with the link on which it is supported to normally urge said member in one direction, an extension on one of the shift key levers engaging with said member when the shift key levers are actuated, complementary abutment members on the shift key levers and lower pair of links, a locking plate moving with the upright arms, an upright arm carried by one of the shift key levers, a pivotally supported locking dog to engage the locking plate when the parts are in lower case position, a link connecting the upright arm and locking dog, and a spring connecting said upright arm with one of the lower links to normally sustain the shift key levers in an upper position and to normally cause engagement of the locking dog with the locking plate.

12. In a typewriting machine, two horizontally disposed and pivotally supported shift key levers connected to move in unison, vertical shift arms, an upper and a lower pair of horizontally disposed and pivotally supported parallel links pivotally connected to said vertical shift arms, an intermediate cushioning member pivotally supported on one of the lower parallel links, a spring connecting with said member and with the link on which it is supported to normally urge said member in one direction, an extension on one of the shift key levers engaging with said member when the shift key levers are actuated, complementary abutment members on the shift key levers and lower pair of links, a locking plate moving with the upright arms, an upright arm carried by one of the shift key levers, a pivotally supported locking dog to engage the locking plate when the parts are in lower case position, a link connecting the upright arm and locking dog, a spring connecting said upright arm with one of the lower links to normally sustain the shift key levers in an upward position and to normally cause engagement of the locking dog with the locking plate, and compressible bumper stops on the framework for limiting the movement of the lower pair of links.

13. In a typewriting machine, two horizontally disposed and pivotally supported shift key levers connected to move in unison, vertical shift arms, an upper and a lower pair of horizontally disposed and pivotally supported parallel links pivotally connected to said vertical shift arms, an intermediate cushioning member pivotally supported on one of the lower parallel links, a spring connected with said member and with the link on which it is supported to normally urge the said member in one direction, an extension on one of the shift key levers engaging with said member when the shift key levers are actuated, complementary abutment members on the shift key levers and lower pair of links, a locking plate moving with the upright arms, an upright arm carried by one of the shift key levers, a pivotally supported locking dog to engage the locking plate when the parts are in lower case position, a link connecting the upright arm and locking dog, a spring connecting said upright arm with one of the lower links to normally sustain the shift key levers in an upper position and to normally cause engagement of the locking dog with the locking plate, and carriage balance springs connected with the lower pair of links.

14. In a typewriting machine, two horizontally disposed and pivotally supported shift key levers connected to move in unison, vertical shift arms, an upper and a lower pair of horizontally disposed and pivotally supported parallel links pivotally connected to said vertical shift arms, an intermediate cushioning member pivotally supported on one of the lower parallel links, a spring connected with said member and with the link on which it is supported to normally urge said member in one direction, an extension on one of the shift key levers engaging with said member when the shift key levers are actuated, complementary abutment members on the shift key levers and lower pair of links, a locking plate moving with the upright arms, an upright arm carried by one of the shift key levers, a pivotally supported locking dog to engage the locking plate when the parts are in lower case position, a link connecting the upright arm and locking dog, a spring connecting said upright arm with one of the lower links to normally sustain the shift key levers in an upper position and to normally cause engagement of the locking dogs with the locking plate, carriage balance springs connected with the lower pair of links, and compressible bumper stops on the framework for limiting the movement of the lower pair of links.

15. In a typewriting machine, carriage shift means, a horizontally disposed rocking member connected with said shift means, vertically extending carriage balance springs connected with said rocking member, brackets, supported on horizontal pivots above said rocking members, on which the carriage balance springs are anchored, and vertically extending members, rotatably adjustable from the top thereof to vary the position of the brackets, located directly beneath the dust sheds of the machine.

Signed at New York city, in the borough of Manhattan, county and State of New York, this 1st day of July, 1920.

EDWARD B. HESS.
LEWIS C. MYERS.